Jan. 11, 1944. J. HASSENFELD Re. 22,417

RECEPTACLE

Original Filed July 27, 1938 2 Sheets-Sheet 1

JACK HASSENFELD
INVENTOR

BY Thomas A. Jenkins
ATTORNEY

RECEPTACLE

Original Filed July 27, 1938 2 Sheets-Sheet 2

JACK HASSENFELD
INVENTOR
BY Thomas A. Jenkins
ATTORNEY

Reissued Jan. 11, 1944

Re. 22,417

UNITED STATES PATENT OFFICE 22,417

RECEPTACLE

Jack Hassenfeld, Providence, R. I.

Original No. 2,141,952, dated December 27, 1938, Serial No. 221,549, July 27, 1938. Application for reissue December 27, 1940, Serial No. 371,960

8 Claims. (Cl. 229—27)

My invention relates to improvements in receptacles and blanks for use in the manufacture thereof.

An object of my invention is to provide a receptacle for holding small articles which is folded in the form of a book to provide an attractive package for the articles having a distinct appeal to the purchaser.

An object of my invention is to provide a receptacle which may be made practically entirely by machinery, including the steps of cutting out the blank of the desired shape and providing it with desired slotted portions to form tabs and if desired with other holes for the objects to be contained within the compartments and providing said blank with desired fold lines, all of which may be readily done by machinery. The blank then may be also similarly glued by machinery, the infolds suitably made and the exterior portions thereof compressed to form two compartments, one in each cover portion of the book, gluing or otherwise securing the various parts together. The only operation which has to be done by hand is to push up the bottom edge of the large receptacle compartment to provide an article holding compartment and as the articles are inserted within said compartment the tabs are forced down to form end walls for the compartment.

An object of my invention, therefore, is to provide a structure which may be substantially entirely fabricated and assembled by machinery except the last step of actually raising up the compartment, the completion of the compartment being effected by the insertion of articles within.

My invention is particularly adapted for use in holding small articles like wax crayons and drawing sheets. However, if desired wooden crayons or pencils may be substituted for the crayons, and my invention is particularly adapted to provide a receptacle if desired in the nature of a portfolio for holding envelopes and letter paper in either compartment, or if desired, for filing cards or other small articles.

A further object of my invention is to provide a receptacle which may be made from a single piece of cardboard with practically no waste in the cardboard or other material.

A further object of my invention is to provide a structure whereby the infolds which form the end walls of the compartment may space the compartment inner and outer walls to retain them in position.

These and such other objects of my invention as may hereinafter appear will be best understood from a description of the accompanying drawings which illustrate various embodiments thereof.

Figure 1:
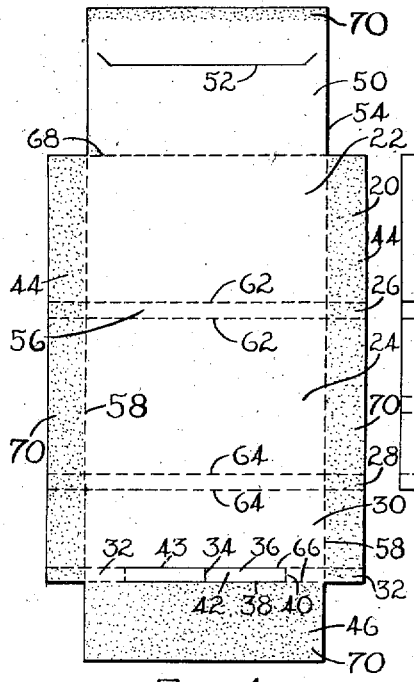
Fig. 1 is a plan view of a blank for constructing an improved embodiment of my invention provided with the desired slits and desired fold lines and glued in the desired places.

In the drawings, wherein like characters of reference indicate like parts throughout, 20 generally indicates a book simulating receptacle constructed in accordance with my invention, comprising a front book cover simulating portion 22, a rear book cover simulating portion 24 and an end cover portion 26 of substantially the combined thicknesses of the front compartment and the rear compartment pivotally joining the adjacent ends of said front and rear cover portions together. One of said cover portions in the embodiment shown, the rear cover portion 24, has an extension 28 of the desired compartment thickness therein forming a compartment base 28 secured thereto having an extension 30 of the desired compartment height forming an outer compartment wall 30 secured thereto having an extension 32 of the desired compartment thickness forming a compartment top secured thereto centrally vertically slitted as at 34 and transversely slitted along the top and bottom edges thereof as at 36 and 38 respectively from points 40 spaced from each end thereof to form the tabs 42. If desired, for either assembly and for a purpose to be described each edge of said cover portion 22, 24 and 26 and compartment portions 28, 30 and 32 may be provided with continuous extensions 44 adapted to be infolded, thus of substantially the combined height of said cover portions and compartment forming extensions to project inwardly over the edges of said portions and extensions and be secured thereto. Said compartment top 32 is also provided with an extension 46 secured to the infolds 44 and adjacent cover portion 24 interior of said infolds 44. It is apparent that the infolds 44 may be secured to the adjacent cover and compartment forming extensions by means of glue, or other adhesive, and that the cover portion 46 may be secured on top of said infolds and adjacent cover portion by means of glue or other equivalent material.

In the preferred embodiment shown, the other of said compartment portions 22, namely the front cover portion 22, is provided with an extension 50 of substantially the height of said other compartment downfolded to form a compartment outer wall and secured to said infolds and the respective cover portion 22 interior of said infolds to form the other compartment. If desired, the portion 50 may be provided with a suitable slit 52 therein to provide an opening 52 for said other compartment through which papers may be inserted to the other compartment. If desired said other compartment however may be omitted. If also desired the infolds 44 may be omitted as well as the tabs 40. Any means extending downwardly from the ends of the opening 43 formed by said tabs or otherwise in the compartment upper wall 32 to form compartment end walls spacing said compartment inner and outer walls may be provided whether or not said means may be integral with the rest of the receptacle or otherwise. For cheapness of assembly, however, I prefer the integral tab construction shown for forming the end walls of the compartment. The infolds 44 are preferably desirable particularly in the cover portion 24 and compartment outer wall 30 so as to provide stops to limit the outward pivotal movement of said tabs 40 to provide the end walls for the compartment. I have shown in Figs. 8 to 11 a receptacle having a compartment of substantial thickness on both the wall and rear cover portions 22 and 24, and in this instance the end cover portions 26 are of substantially double the thickness of the front compartment and also that of the rear compartment and the structure for the upper compartment comprises extensions from the front book cover simulating portion of exact duplicates of those hitherto described for the rear book cover simulating portion, the portions thereof shown in said figures being primed to indicate the duplication of the parts.

Similarly in this embodiment the infolds 44 and/or tabs 42 may be omitted if desired.

As the starting point for my invention I provide the book simulating blank shown in Fig. 1, comprising a sheet of cardboard 54 or 54', or like stiff material, comprising a central portion 56 having the spaced fold lines 58 spaced from each edge thereof to provide the infolds 44 hitherto described. A pair of transverse center end cover forming portion fold lines 62 are provided forming the center portion 26 and an end portion 24 thereof into a front book cover simulating portion 22 and a rear book cover simulating portion 24 of equal height spaced apart to provide a book end cover portion 26 substantially of the combined thicknesses of a front compartment and a rear compartment. The other end of said center portion 24 has a pair of transverse fold lines 64 spaced to form between them a compartment base 28 of the desired thickness at the end of the adjacent cover portion 24 and spaced transverse fold lines 66 spaced from said last mentioned fold lines 64 an amount sufficient to form a compartment outer wall 30 and from each other an amount sufficient to form a compartment top 32, said compartment top portion 32 having a central slit 34 therein and being transversely slitted along the top and bottom edges thereof as at 36 and 38 from points 40 spaced from each end thereof to form the tabs 42, said compartment top portion having a portion of lesser width projecting therefrom from the outer wall of last mentioned fold line 66. If desired, the opposite end of said center portion 22 may be provided with a portion 50 substantially of equal width projecting therefrom along the fold line 68 to provide a cover for the opposite compartment and having a transverse slit 52 therein for the reception of papers in such compartment.

Figure 8:
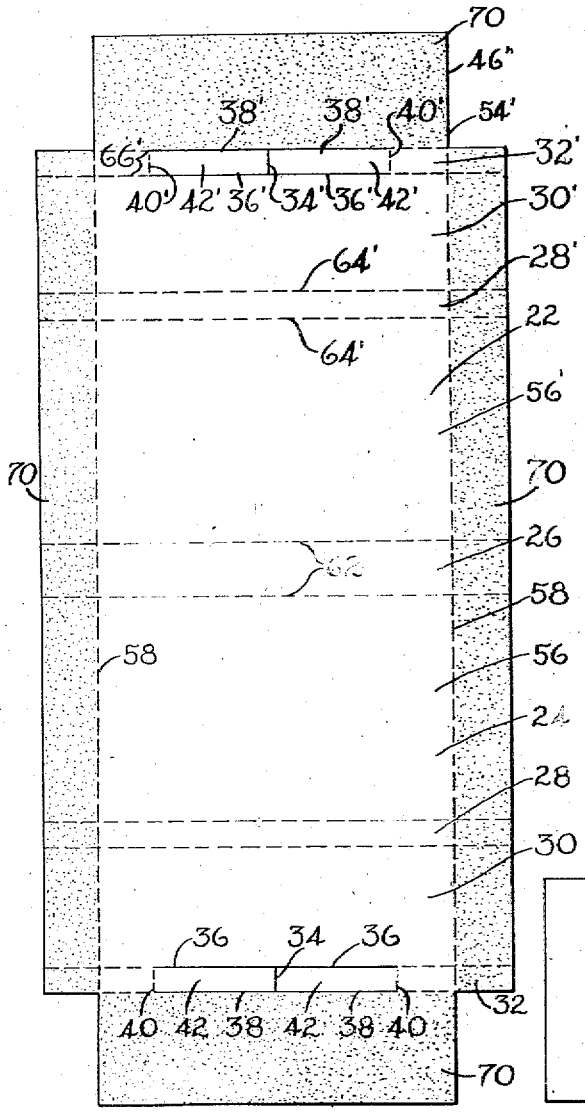
Fig. 8 is a plan view of a blank for forming a book simulating receptacle of the same type having enlarged article receiving compartments in each of the front and rear covers thereof, said covers being joined together by the end cover portion of double the thickness shown in Figs. 1 to 7, after the blanks have been cut, fabricated and provided with the desired fold lines and glue.
Figure 9:
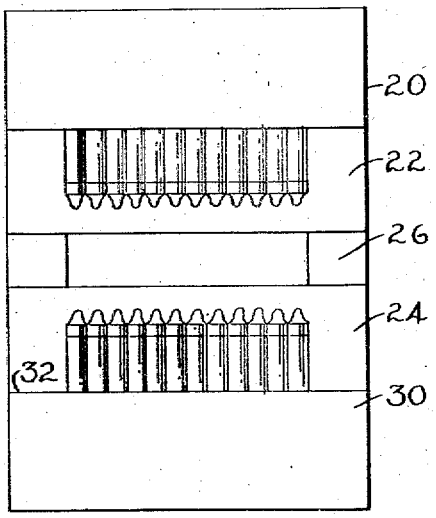
Fig. 9 is a plan view of the blank shown in Fig. 8 after each compartment has been loaded with articles and being generally similar to Fig. 5.
Figure 10:
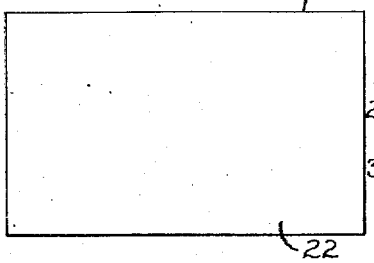
Fig. 10 is a plan view of the double compartment receptacle illustrated in Figs. 8 and 9.
Figure 11:
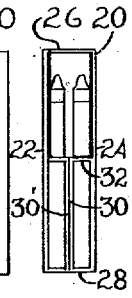
Fig. 11 is an end elevation of this embodiment.

As stated hitherto, if desired, the front cover portion 22 may be constructed in identical fashion as the rear cover portion 24 to provide a front compartment as well as a rear compartment for my improved receptacle. Figs. 1 and 8 illustrate my improved receptacle after it has been cut into the desired shape with the desired infold portions 44, transverse fold lines 62, 64, 66 and 68 and longitudinal fold lines 58 to form the tab portions 44 and with the desired slits 34, 36 and 38 to form the tabs 42 and the desired slit 52. As also shown in Figs. 1 and 8 the infolds 44 may be provided with the glue 70 thereon, the extension 46 may be provided with the glue 70 thereon and the extension 50 may be provided with the glue on the upper surface thereof only. Then by means of a suitable machine the blank 54 first has the infolds 44 folded thereover to provide the infolds 44 secured to said respective cover portions and compartment forming portions along the edges thereof. The compartment outer wall portions 30 and attached portion of lesser width may then be infolded by machinery or otherwise along the outermost fold line 64 so that the flap extension 46 may be secured to the inner portion of the rear cover portion 24 and the extension 50 of lesser width may be infolded along the fold line 68 so that it may be stuck to said respective front cover portion 22 to provide the other or upper compartment of relatively small width. The operations hitherto described may be performed by a suitable type of automatic machine.

Figure 2:
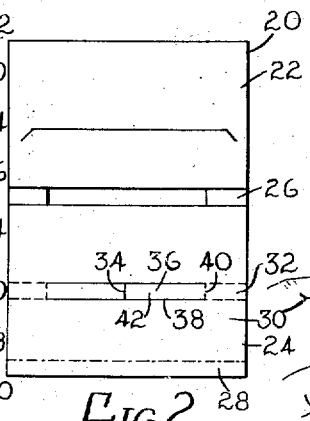
Fig. 2 is a plan view of such a blank after the infolds have been glued to the body of the blank and the ends portions thereof infolded to form a flat intermediate product.
Figure 3:
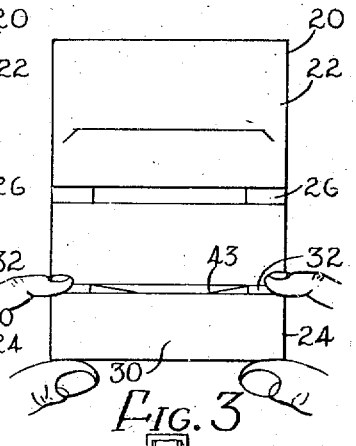
Fig. 3 is a plan view of the intermediate product shown in Fig. 1 after the lower edge thereof has been pushed upwardly to provide a compartment.
Figure 7:
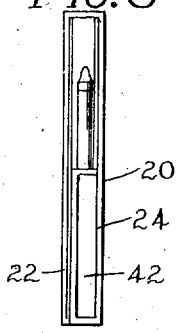
Fig. 7 is an end elevation of the assembled book shown in Fig. 6.
Figure 4:
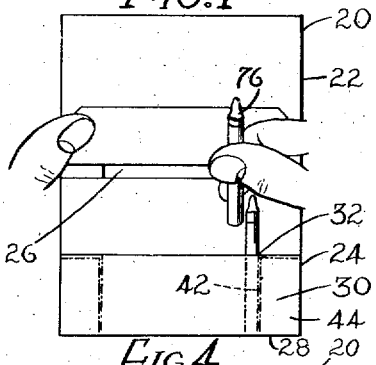
Fig. 4 is a plan view of the device shown in Fig. 3 showing how the tabs are downfolded to provide a compartment by the act of assembling crayons or other articles in the compartment, the tabs being limited in their movement by the lateral infolds.
Figure 6:
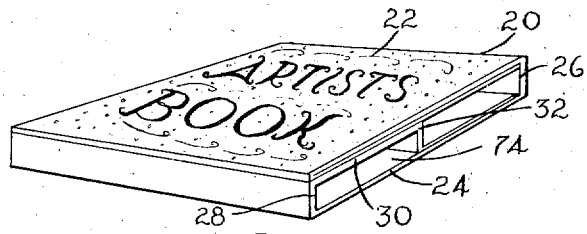
Fig. 6 is a perspective view of my improved receptacle shown in Fig. 5 after the cover portion has been downfolded to form a book simulating receptacle.
Figure 5:
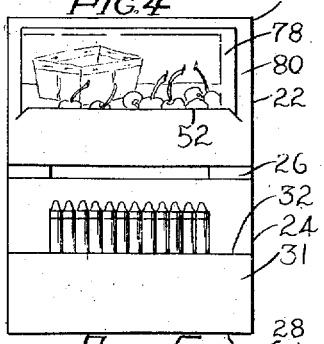
Fig. 5 is a plan view of my device after a drawing sheet is inserted in one compartment and the crayons in the other.

The device then may be sent to the assembler in substantially the form shown in Fig. 2. It is then merely necessary to push the lower edge upwards as shown in Fig. 3 to cause the blank to bend along the lower fold line 64 to provide a compartment 74 of the thickness of said compartment top portion 32 and compartment base 28. Then as shown in Fig. 4, as the crayons 76 or other articles are inserted within the compartment 74 through the hole 43 formed by said tabs, the tabs 42 are pushed downwards until they assume the position shown in Figs. 4 and 5 abutting the inner edges of the infolds 44 within said compartment to form the compartment end walls 42 as shown in Fig. 7. If desired, a sheet 78 may be inserted through the slit 52 in the thin upper compartment 80 and the front cover portion pivoted over the rear cover portion, the fold lines 62 bending for this purpose, to provide the booklike receptacle shown in Fig. 6. If a double compartment receptacle of substantial thickness be provided the blank shown in Fig. 8 is similarly folded and assembled into the double compartment book 20′ shown in Fig. 10.

It is apparent, therefore, that I have provided a novel type of book simulating receptacle for small articles constructed of a single sheet of cardboard which may be manufactured by machinery substantially in its entirety with the exception of the final compartment forming and article loading steps with the other advantages described above.

It is understood that my invention is not limited to the specific embodiments shown and that various deviations may be made therefrom without departing from the spirit and scope of the appended claims.

What I claim is:

1. A book simulating receptacle, comprising a front book cover simulating portion, a rear book cover simulating portion and an end cover portion substantially the combined thickness of a front compartment and a rear compartment pivotally joining adjacent ends of said front and rear cover portions together, one of said cover portions having an extension of the desired compartment thickness forming a compartment base secured thereto having an extension of the desired compartment height forming an outer compartment wall secured thereto having an extension of the desired compartment thickness forming a compartment top secured thereto centrally slitted and transversely slitted along the top and bottom edges thereof from points spaced from each end thereof to form tabs, infolds of substantially the combined height of said cover portions and compartment forming extensions projecting inwardly over the edges of said portions and extensions, said compartment top having an extension secured to said infolds and adjacent cover portion interior of said infolds whereby said tabs may be downfolded to form an opening in the compartment top by the insertion of articles to be held in said compartment through said opening and to abut the inner edge of said infolds in said compartment walls to form compartment end walls and the other of said cover portions having an extension of substantially the desired height of the other compartment downfolded to form a compartment outer wall and secured to said infolds and respective cover portion interior of said infolds to form the other compartment and having a slit therein to provide an opening for said other compartment.

2. A book simulating receptacle, comprising a front book cover simulating portion, a rear book cover simulating portion and an end cover portion substantially the thickness of a compartment pivotally joining adjacent ends of said front and rear cover portions together, one of said cover portions having an extension of the desired compartment thickness forming a compartment base secured thereto having an extension of the desired compartment height forming an outer compartment wall secured thereto having an extension of the desired compartment thickness forming a compartment top secured thereto centrally slitted and transversely slitted along the top and bottom edges thereof from points spaced from each end thereof to form tabs, infolds of substantially the combined height of said cover portions and compartment forming extensions projecting inwardly over the edges of said portions and extensions, said compartment top having an extension secured to said infolds and adjacent cover portion interior of said infolds whereby said tabs may be downfolded to form an opening in the compartment top by the insertion of articles to be held in said compartment through said opening and to abut the inner edge of said infolds in said compartment walls to form compartment end walls.

3. A book simulating receptacle, comprising a front book cover simulating portion, a rear book cover simulating portion and an end cover portion substantially the thickness of a compartment pivotally joining adjacent ends of said front and rear cover portions together, one of said cover portions having an extension of the desired compartment thickness forming a compartment base secured thereto having an extension of the desired compartment height forming an outer compartment wall secured thereto having an elongated hole therein and means extending downwardly from the ends of said opening to form compartment end walls spacing said compartment inner and outer walls, infolds of substantially the combined height of said cover portions and compartment forming extensions projecting inwardly over the edges of said portions and extensions, said compartment top having a flat extension secured to said adjacent cover portion.

4. A book simulating receptacle, comprising a front book cover simulating portion, a rear book cover simulating portion and an end cover portion substantially the combined thickness of a front compartment and a rear compartment pivotally joining adjacent ends of said front and rear cover portions together, each of said cover portions having an extension of the desired compartment thickness forming a compartment base secured thereto having an extension of the desired compartment height forming an outer compartment wall secured thereto having an extension of the desired compartment thickness forming a compartment top secured thereto centrally slitted and transversely slitted along the top and bottom edges thereof from points spaced from each end thereof to form tabs, infolds of substantially the combined height of said cover portions and compartment forming extensions projecting inwardly over the edges of said portions and extensions, said compartment top having an extension secured to said infolds and adjacent cover portion interior of said infolds whereby said tabs may be downfolded to form an opening in the compartment top by the insertion of articles to be held in said compartment through said opening and to abut the inner edge of said infolds in said compartment walls to form compartment end walls.

5. A book simulating receptacle, comprising a front book cover simulating portion, a rear book cover simulating portion and an end cover portion substantially the combined thickness of a front compartment and a rear compartment pivotally joining adjacent ends of said front and rear cover portions together, each of said cover portions having an extension of the desired compartment thickness forming a compartment base secured thereto having an extension of the desired compartment height forming an outer compartment wall secured thereto having an extension of the desired compartment thickness forming a compartment top secured thereto having an elongated hole therein and means extending downwardly from the ends of said opening to form compartment end walls spacing said compartment inner and outer walls, said compartment tops each having an extension secured to its adjacent cover portion.

6. A book simulating receptacle blank for a two compartment display box, comprising a sheet of cardboard or like material comprising a central portion having fold lines spaced from each edge thereof to provide infolds, a pair of transverse central end cover forming portion fold lines dividing the center and an end portion thereof into a front book cover simulating portion and a rear book cover simulating portion of the same height spaced apart to provide a book end cover portion substantially the combined thickness of a front compartment and a rear compartment, the other end of said central portion having a pair of transverse fold lines spaced to form between them a compartment base of the desired thickness at the end of the adjacent cover portion and spaced transverse fold lines spaced from said last mentioned fold lines an amount sufficient to form a compartment outer wall and from each other an amount sufficient to form a compartment top, said compartment top portion having a central slit and being transversely slitted along the top and bottom edges thereof from points spaced from each end thereof to form tabs, said compartment top portion having a portion of lesser width projecting therefrom along a fold line, and the opposite end of said central portion having a portion of equal width projecting therefrom along a fold line having a transverse slit therein.

7. A book simulating receptacle blank for a compartment display box, comprising a sheet of cardboard or like material comprising a central portion having fold lines spaced from each edge thereof to provide infolds, a pair of transverse central end cover forming portion fold lines dividing the center and an end portion thereof into a front book cover simulating portion and a rear book cover simulating portion of the same height spaced apart to provide a book end cover portion substantially the thickness of a compartment, the other end of said central portion having a pair of transverse fold lines spaced to form between them a compartment base of the desired thickness at the end of the adjacent cover portion and spaced transverse fold lines spaced from said last mentioned fold lines an amount sufficient to form a compartment outer wall and from each other an amount sufficient to form a compartment top, said compartment top portion having a central slit and being transversely slitted along the top and bottom edges thereof from points spaced from each end thereof to form tabs, said compartment top portion having a portion of lesser width projecting therefrom along a fold line.

8. A display compartment comprising an upstanding back, an upstanding compartment back portion, a compartment bottom, an upstanding compartment front portion, and a compartment top portion all integrally joined together and means to secure one of said upstanding compartment portions to said back, said top portion being slitted from front to rear and along each front and rear edge thereof to form tabs, each slit along the front and rear edge having a length substantially that of the depth of the compartment, said tabs in their operating positions extending downwardly in said compartment in parallel relationship with their edges contacting the bottom, front and rear walls thereof and forming end walls for said compartment.

JACK HASSENFELD.